United States Patent
Okubo et al.

(10) Patent No.: US 11,300,168 B2
(45) Date of Patent: Apr. 12, 2022

(54) AUTOMATIC TRANSMISSION

(71) Applicant: TOYOTA JIDOSHA KABUSHIKI KAISHA, Toyota (JP)

(72) Inventors: Takashi Okubo, Ashigarakami-gun (JP); Kozo Yamamoto, Nagoya (JP); Keisuke Ninomiya, Susono (JP); Hironori Asaoka, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 388 days.

(21) Appl. No.: 16/599,217

(22) Filed: Oct. 11, 2019

(65) Prior Publication Data

US 2020/0141457 A1    May 7, 2020

(30) Foreign Application Priority Data

Nov. 6, 2018    (JP) .............................. JP2018-209135

(51) Int. Cl.
*F16D 55/08*    (2006.01)
*F16D 55/40*    (2006.01)
(Continued)

(52) U.S. Cl.
CPC .............. *F16D 55/40* (2013.01); *F16D 3/06* (2013.01); *F16D 2121/04* (2013.01); *F16D 2300/06* (2013.01)

(58) Field of Classification Search
CPC ............. F16D 65/853; F16D 2065/786; F16D 2065/782; F16H 57/0421; F16H 57/0423;
(Continued)

(56) References Cited

U.S. PATENT DOCUMENTS 5,911,292 A  *  6/1999  Schade ................. F16D 65/853
                                                        192/70.12
8,715,125 B2     5/2014  Kasuya et al.
(Continued)

FOREIGN PATENT DOCUMENTS

JP        H04-026256 U     3/1992
JP        H5-248519 A      9/1993
(Continued)

OTHER PUBLICATIONS

Abstract for JP 2007-170498 (no date).*
English Translation dated Dec. 14, 2021 Japanese Office Action issued for Japanese Patent Application No. 2018-209135.

*Primary Examiner* — Nicholas J Lane
(74) *Attorney, Agent, or Firm* — Oliff PLC

(57) ABSTRACT

An automatic transmission includes: a multi-disc brake including first and second friction engagement elements which are alternately arranged in an axial direction, and a tube that supplies lubricating oil to the first friction engagement element and the second friction engagement element in a transmission case. Further, the tube has injection holes that inject the lubricating oil toward a spline groove, which is fitted with spline teeth of the first friction engagement element on an inner peripheral surface of the transmission case, and the injection holes open toward a gap, which is formed between the spline groove and the spline teeth, and inject the lubricating oil to cause the lubricating oil to contact a surface of the spline groove located above the spline teeth.

5 Claims, 7 Drawing Sheets

(51) Int. Cl.
*F16D 3/06* (2006.01)
*F16D 121/04* (2012.01)

(58) Field of Classification Search
CPC ............ F16H 57/0426; F16H 57/0456; F16H 57/0458; F16H 57/046; F16H 57/0473; B60T 1/062
See application file for complete search history.

(56) References Cited

U.S. PATENT DOCUMENTS

| | | | |
|---|---|---|---|
| 8,887,880 B2* | 11/2014 | Cliff | F16D 65/853 188/264 D |
| 2012/0196715 A1* | 8/2012 | Turner | F16H 57/0473 475/159 |
| 2018/0031051 A1* | 2/2018 | McKinzie | F16D 13/72 |
| 2018/0306307 A1* | 10/2018 | Kishimoto | F16H 57/0473 |
| 2020/0328656 A1* | 10/2020 | Mcbride | B60L 7/14 |
| 2021/0197657 A1* | 7/2021 | Nelson | B60K 6/387 |
| 2021/0239173 A1* | 8/2021 | Kirkbride | B64D 37/32 |

FOREIGN PATENT DOCUMENTS

| | | | |
|---|---|---|---|
| JP | H10-220566 A | | 8/1998 |
| JP | 2007-056909 A | | 3/2007 |
| JP | 2007170498 A | * | 7/2007 |
| JP | 2007-303623 A | | 11/2007 |
| JP | 2012-172798 A | | 9/2012 |
| JP | 2017-106578 A | | 6/2017 |
| JP | 2018-009689 A | | 1/2018 |

* cited by examiner

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

○: ENGAGEMENT    BLANK: RELEASE

AUTOMATIC TRANSMISSION

CROSS-REFERENCE TO RELATED APPLICATION(S)

The present application claims priority to and incorporates by reference the entire contents of Japanese Patent Application No. 2018-209135 filed in Japan on Nov. 6, 2018.

BACKGROUND

The present disclosure relates to an automatic transmission.

Japanese Laid-open Patent Publication No. 2012-172798 discloses supplying lubricating oil to a plurality of friction engagement elements that configure an engagement device, by discharging lubricating oil from a nozzle toward uneven portions formed on an inner circumference of a clutch hub in an inside of a transmission case that accommodates an automatic transmission. In the configuration described in Japanese Laid-open Patent Publication No. 2012-172798, recessed portions of the uneven portions on the inner circumference side of the hub functions as an oil reservoir, and the lubricating oil can be supplied to the friction engagement element from the inner circumference side of the hub through through-holes formed in a bottom of this recess.

SUMMARY

There is a need for providing an automatic transmission that can deliver lubricating oil to a plurality of friction engagement elements.

According to an embodiment, An automatic transmission includes: a transmission case; a hub which is a rotary member; a multi-disc brake including a first friction engagement element having first plates and a second friction engagement element having second plates, the first plates and the second plates being alternately arranged in an axial direction, the first friction engagement element being spline-fitted to an inner peripheral surface of the transmission case, the second friction engagement element being spline-fitted to the hub; and a tube, which is provided in the transmission case, that supplies lubricating oil to the first friction engagement element and the second friction engagement element. Further, the tube has injection holes that inject the lubricating oil toward a spline groove, which is fitted with spline teeth of the first friction engagement element on the inner peripheral surface of the transmission case, and the injection holes open toward a gap, which is formed between the spline groove and the spline teeth, and inject the lubricating oil to cause the lubricating oil to contact a surface of the spline groove located above the spline teeth.

DETAILED DESCRIPTION

In the configuration described in Japanese Laid-open Patent Publication No. 2012-172798, in order to supply the lubricating oil around the entire circumference of the friction engagement element, it is required to dispose a sleeve radially inward of the hub, and connect a space radially interposed between the hub and the sleeve over the entire circumference direction on the inner circumference side of the hub. That is, in the configuration described in Japanese Laid-open Patent Publication No. 2012-172798, in addition to the nozzle for discharge of lubricating oil, it is required to provide the sleeve as a member to distribute the lubricating oil in the circumference direction. Therefore, adding the sleeve may lead to an increase in cost and an increase in weight.

Hereinafter, an automatic transmission according to an embodiment of the present disclosure will be specifically described with reference to the drawings. Note that the present disclosure is not limited to the embodiment described below.

Figure 1:
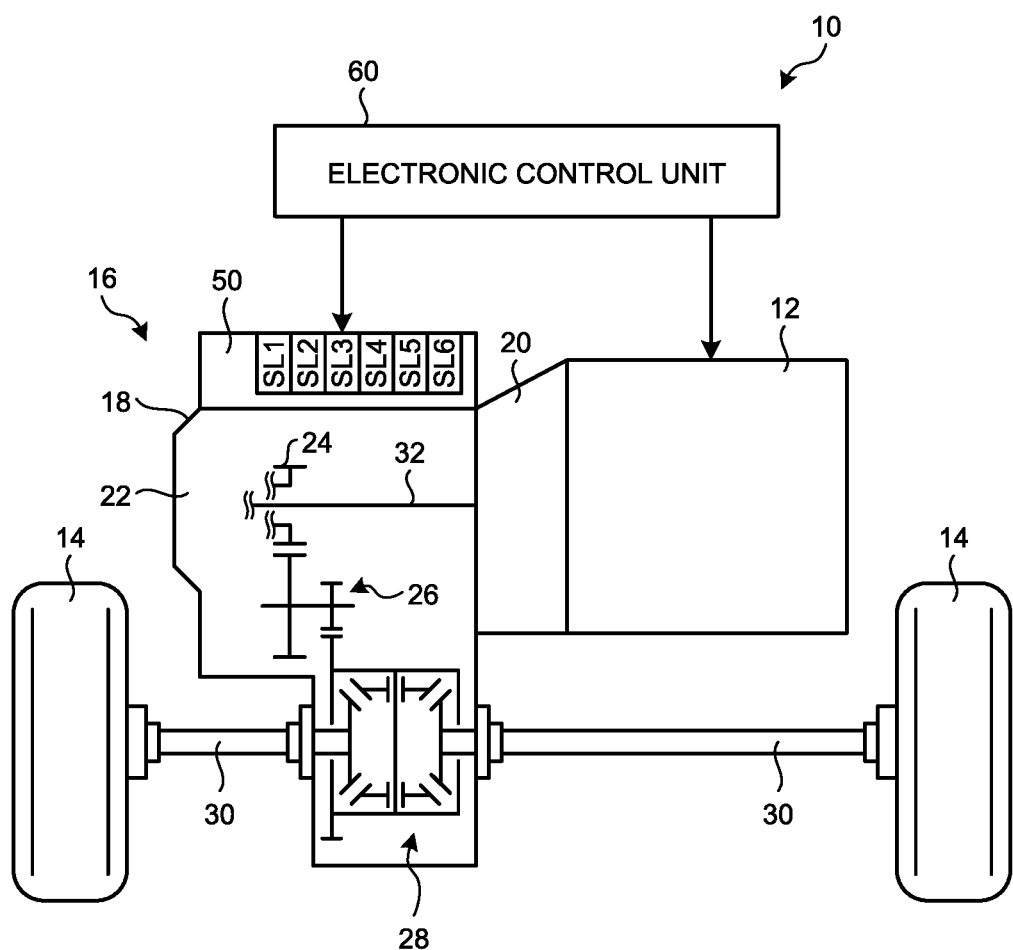
FIG. 1 is a view illustrating a schematic configuration of a vehicle equipped with an automatic transmission according to an embodiment.

FIG. 1 is a view illustrating a schematic configuration of a vehicle equipped with an automatic transmission according to an embodiment. A vehicle 10 includes an engine 12, a drive wheel 14, and a power transmission device 16 provided in a power transmission path between the engine 12 and the drive wheel 14. The power transmission device 16 includes, inside a transmission case 18 attached to a vehicle body, a torque converter 20, an automatic transmission 22, and a reduction gear mechanism 26 coupled to an output gear 24 as an output rotary member of the automatic transmission 22, a differential gear 28 coupled to the reduction gear mechanism 26, and a drive shaft 30. Power outputted from the engine 12 is transmitted to the drive wheel 14 by being transmitted in the order of the torque converter 20, the automatic transmission 22, the reduction gear mechanism 26, the differential gear 28, and the drive shaft 30.

The engine 12 is a driving power source for traveling, and is a known internal combustion engine such as a gasoline engine or a diesel engine. An electronic control unit 60 controls an operation state of this engine 12 such as an intake air amount, a fuel supply amount, and an ignition timing. Note that a detailed configuration of the electronic control unit 60 will be described later.

Figures 2, 3:
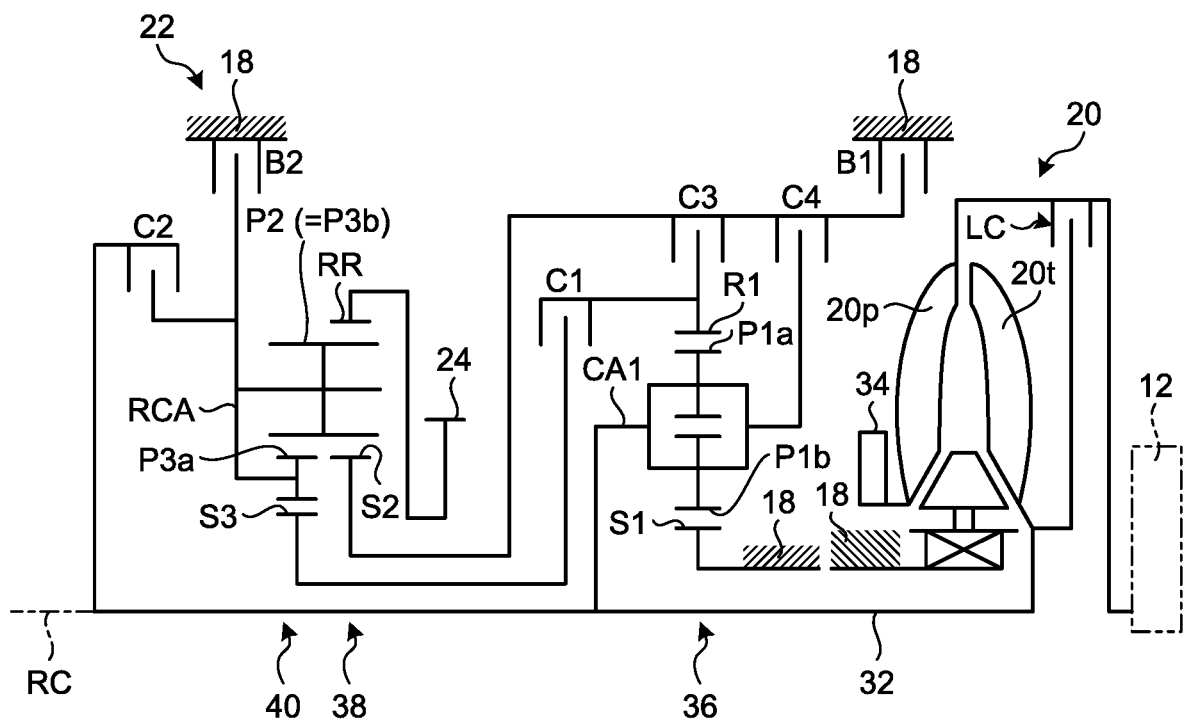
FIG. 2 is a skeleton view illustrating an example of the automatic transmission.
FIG. 3 is a chart illustrating an engagement device to be engaged to set each shift stage.

FIG. 2 is a skeleton diagram illustrating an example of the automatic transmission 22. The torque converter 20, the automatic transmission 22, and the like are configured substantially symmetrically with respect to an axial center RC of a transmission input shaft 32, which is an input rotary member of the automatic transmission 22.

The torque converter 20 is a fluid transmission device that is arranged so as to rotate around the axial center RC in a power transmission path between the engine 12 and the automatic transmission 22. As illustrated in FIG. 2, the torque converter 20 has a pump impeller 20$p$ and a turbine runner 20*t*. The pump impeller 20*p* is an input rotary member of the torque converter 20 and is coupled to the engine 12. The turbine runner 20*t* is an output rotary member of the torque converter 20 and is coupled to the transmission input shaft 32. Furthermore, the torque converter 20 includes a lockup clutch LC as a direct coupling clutch that couples the pump impeller 20*p* and the turbine runner 20*t*. Further, the power transmission device 16 also includes a mechanical oil pump 34 coupled to the pump impeller 20*p*. The mechanical oil pump 34 is driven by the engine 12 and discharges hydraulic oil sucked from an oil pan or the like. This hydraulic fluid discharged from the mechanical oil pump 34 is used in performing shift control of the automatic transmission 22 and switching control of an operation state of the lockup clutch LC, or supplied as lubricating oil to a portion requiring lubrication in the power transmission device 16. The mechanical oil pump 34 functions as a hydraulic pressure supply source of a hydraulic control circuit 50.

The automatic transmission 22 is a stepped automatic transmission that forms a part of the power transmission path between the engine 12 and the drive wheel 14. As illustrated in FIG. 2, the automatic transmission 22 is a multistage transmission of a planetary gear type having a double-pinion first planetary gear device 36, a single-pinion second planetary gear device 38, and a double-pinion third planetary gear device 40 on a same axis (on the axial center RC). The second planetary gear device 38 and the third planetary gear device 40 configure a Ravigneaux planetary gear device. The first planetary gear device 36 functions as a main transmission unit. The Ravigneaux planetary gear device described above functions as an auxiliary transmission unit disposed downstream of the main transmission unit. Furthermore, the automatic transmission 22 includes a plurality of engagement devices of a first clutch C1, a second clutch C2, a third clutch C3, a fourth clutch C4, a first brake B1, and a second brake B2 (hereinafter may be simplified as "engagement devices CB" when being not particularly discriminated).

The first planetary gear device 36 includes: a first sun gear S1; a plurality of pairs of first pinion gears P1*a* and P1*b* meshed with one another; a first carrier CA1 supporting the first pinion gears P1*a* and P1*b* to be rotatable and revolvable; and a first ring gear R1 meshed with the first sun gear S1 via the first pinion gears P1*a* and P1*b*. The second planetary gear device 38 includes: a second sun gear S2; a second pinion gear P2; a carrier RCA supporting the second pinion gear P2 to be rotatable and revolvable; and a ring gear RR meshed with the second sun gear S2 via the second pinion gear P2. The third planetary gear device 40 includes: a third sun gear S3; a plurality of pairs of third pinion gears P3*a* and P3*b* meshed with one another; a carrier RCA supporting the third pinion gears P3*a* and P3*b* to be rotatable and revolvable; and a ring gear RR meshed with the third sun gear S3 via the third pinion gears P3*a* and P3*b*. In the second planetary gear device 38 and the third planetary gear device 40 of the Ravigneaux type, the third pinion gear P3*b* and the second pinion gear P2 of a long pinion gear are made common, and the carrier RCA and the ring gear RR are made common.

The engagement device CB is hydraulic friction engagement device, and is formed by a wet multi-disc clutch or brake pressed by a hydraulic actuator. In the engagement devices CB, each operation state is switched by individually changing a torque capacity in accordance with a hydraulic pressure as an engagement pressure individually outputted from a plurality of solenoid valves SL1 to SL6 and the like included in the hydraulic control circuit 50. In the automatic transmission 22, rotating elements of the first to third planetary gear devices 36, 38, and 40 are connected or released by the engagement device CB, or selectively fixed.

In detail, the first sun gear S1 is coupled to the transmission case 18. The first carrier CA1 is coupled to the transmission input shaft 32. The first carrier CA1 and the second sun gear S2 are selectively coupled via the fourth clutch C4. The first ring gear R1 and the third sun gear S3 are selectively coupled via the first clutch C1. The second sun gear S2 is selectively coupled to the transmission case 18 via the first brake B1. The carrier RCA is selectively coupled to the transmission input shaft 32 via the second clutch C2. Further, the carrier RCA is selectively coupled to the transmission case 18 via the second brake B2. The ring gear RR is coupled to the output gear 24.

The automatic transmission 22 can selectively form a plurality of shift stages having different gear ratios $\gamma$ by selective engagement of any of the engagement devices CB in accordance with an accelerator operation of a driver, a vehicle speed, and the like, by the electronic control unit 60. In the automatic transmission 22, for example, as in the engagement operation illustrated in FIG. 3, individual gear stages (individual shift stages) of eight forward gear stages of the first gear stage "1st" to the eighth gear stage "8th" and a reverse gear stage "Rev" are selectively formed. The gear ratio $\gamma$ of the automatic transmission 22 corresponding to each shift stage is appropriately determined by individual gear ratios (=number of teeth of sun gear/number of teeth of ring gear) of the first planetary gear device 36, the second planetary gear device 38, and the third planetary gear device 40. The gear ratio $\gamma$ of the first gear stage "1st" is the largest, and the gear ratio $\gamma$ is smaller on the high vehicle speed side (the eighth gear stage "8th" side).

The chart illustrated in FIG. 3 summarizes a relationship between each shift stage formed by the automatic transmission 22 and individual operation states of the engagement devices CB. In FIG. 3, the symbol "o" indicates engagement, and a blank indicates release. As illustrated in FIG. 3, in the forward gear stage, the first gear stage "1st" is established by engagement of the first clutch C1 and the second brake B2. The second gear stage "2nd" is established by engagement of the first clutch C1 and the first brake B1. The third gear stage "3rd" is established by engagement of the first clutch C1 and the third clutch C3. The fourth gear stage "4th" is established by engagement of the first clutch C1 and the fourth clutch C4. The fifth gear stage "5th" is established by engagement of the first clutch C1 and the second clutch C2. The sixth gear stage "6th" is established by engagement of the second clutch C2 and the fourth clutch C4. The seventh gear stage "7th" is established by engagement of the second clutch C2 and the third clutch C3. The eighth gear stage "8th" is established by engagement of the second clutch C2 and the first brake B1. In addition, the reverse gear stage "Rev" is established by engagement of the third clutch C3 and the second brake B2. Furthermore, the automatic transmission 22 is brought into a neutral state by releasing all of the engagement devices CB.

Referring back to FIG. 1, the vehicle 10 includes the electronic control unit 60 as a controller that controls the vehicle 10. The electronic control unit 60 is an ECU configured to include, for example, a microcomputer provided with a central processing unit (CPU), a random access memory (RAM), a read only memory (ROM), an input/output interface and the like.

The electronic control unit 60 is input with signals from various sensors and the like mounted on the vehicle 10. The various centers include a vehicle speed sensor, an engine rotational speed sensor, an input rotational speed sensor, an output rotational speed sensor, an accelerator opening degree sensor, a throttle opening degree sensor, a brake switch, a shift position sensor, an oil temperature sensor and the like. The vehicle speed sensor detects a vehicle speed. The engine rotational speed sensor detects an engine rotational speed. The input rotational speed sensor detects a rotational speed of the transmission input shaft 32, which is an input rotational speed of the automatic transmission 22. The output rotational speed sensor detects a rotational speed of the output gear 24, which is an output rotational speed of the automatic transmission 22. The accelerator opening degree sensor detects an accelerator opening degree, which is an operation amount of an accelerator pedal. The throttle opening degree sensor detects a throttle opening degree, which is an opening degree of the electronic throttle valve. The brake switch detects that a brake operating member for operation of a wheel brake has been operated by the driver. The shift position sensor detects an operation position (shift position) of a shift lever, such as "P", "R", "N", and "D". The oil temperature sensor detects a temperature of hydraulic oil in the hydraulic control circuit 50.

This electronic control unit 60 controls the vehicle 10 by performing shift control of the automatic transmission 22 and hydraulic control of the hydraulic control circuit 50 on the basis of input signals from various sensors. This electronic control unit 60 outputs a command signal to each device as a control target mounted on the vehicle 10. For example, in engagement control of the engagement device CB, a hydraulic pressure command signal for controlling an operation state of the engagement device CB is output from the electronic control unit 60 to the hydraulic control circuit 50. This hydraulic pressure command signal is a command signal for driving the individual solenoid valves SL1 to SL6 that adjust a hydraulic pressure (engagement pressure and release pressure) supplied to the individual hydraulic actuators of the engagement devices CB.

Further, the electronic control unit 60 can control the hydraulic control circuit 50 in order to supply lubricating oil to the second brake B2. In the automatic transmission 22, lubricating oil is supplied to the friction engagement element to perform cooling with the lubricating oil, in order to suppress a temperature rise of the friction engagement element of the second brake B2 due to frictional heat. That is, the second brake B2 is configured to be able to cool the plurality of friction engagement elements by the lubricating oil supplied from the hydraulic control circuit 50.

Figure 4:
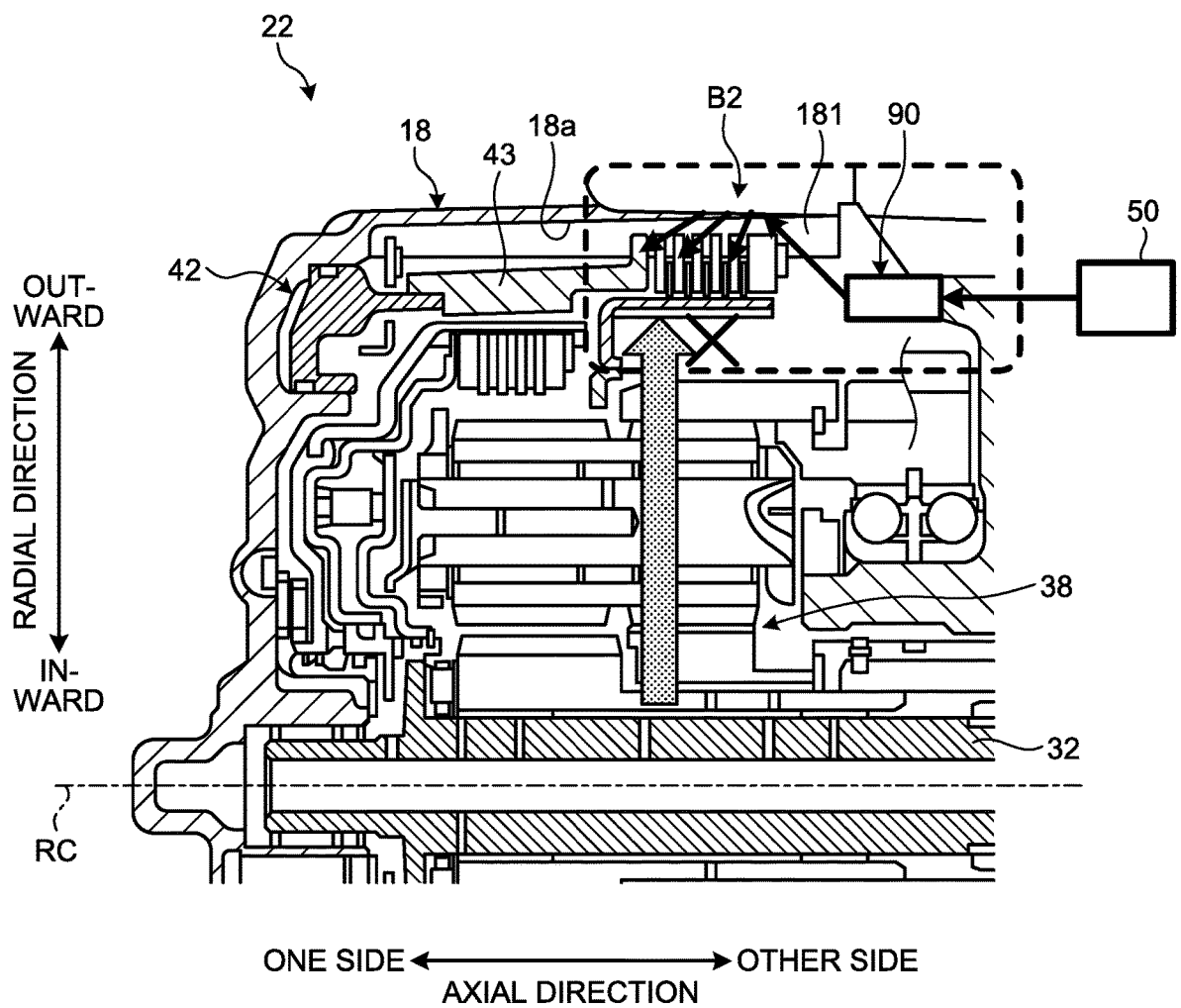
FIG. 4 is a view illustrating an internal structure of a transmission case.
Figure 5:
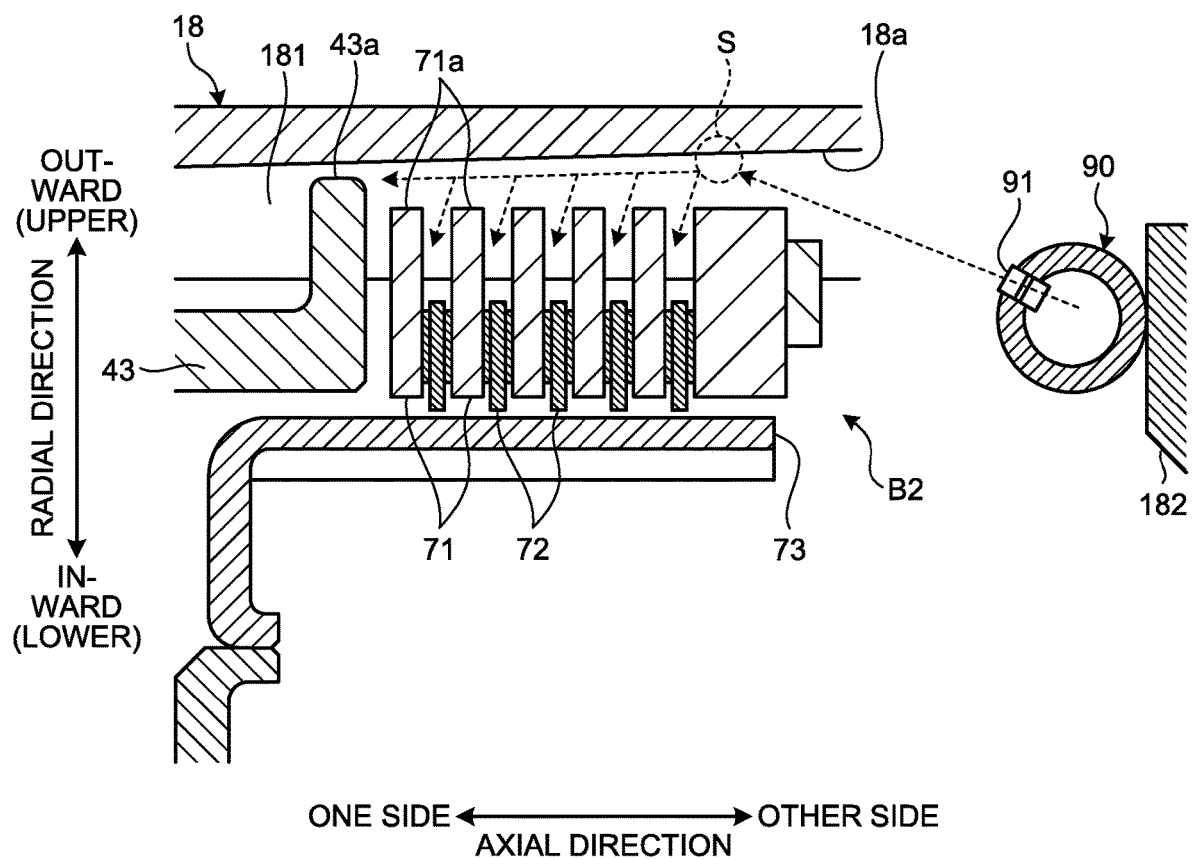
FIG. 5 is a schematic view illustrating a method of supplying lubricating oil from a tube of a supply device to a friction engagement element.
Figure 6:
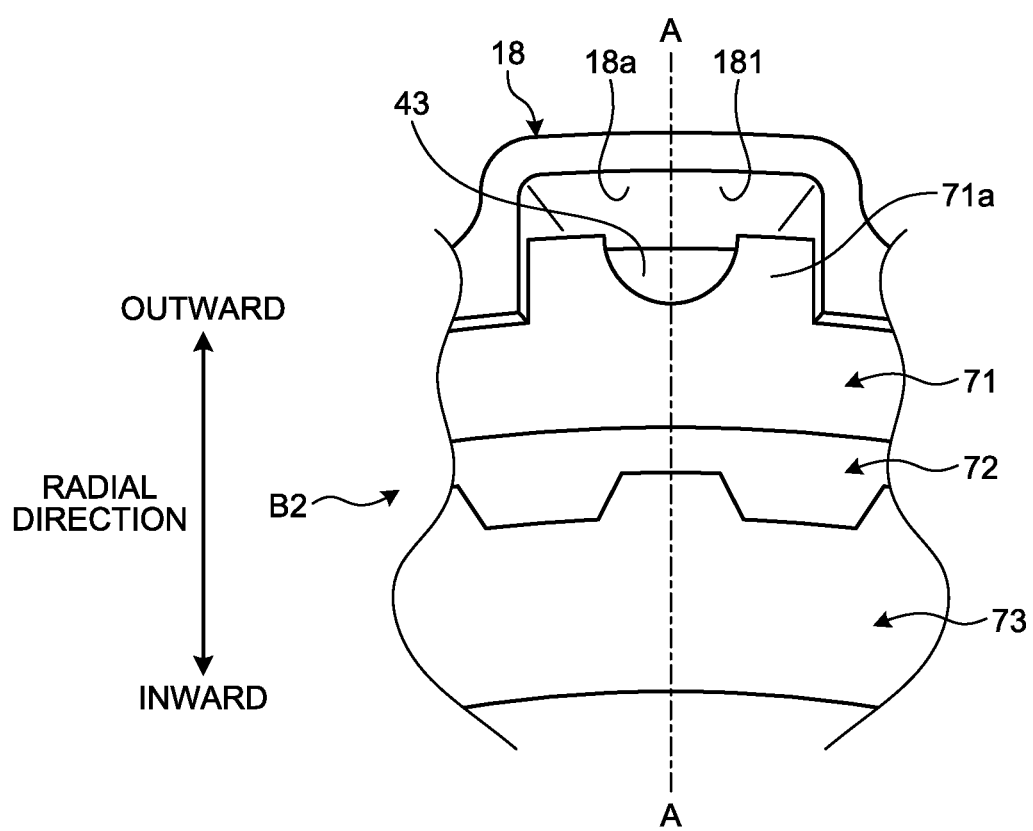
FIG. 6 is a schematic view illustrating a case where a second brake is viewed from an axial direction.
Figure 7:
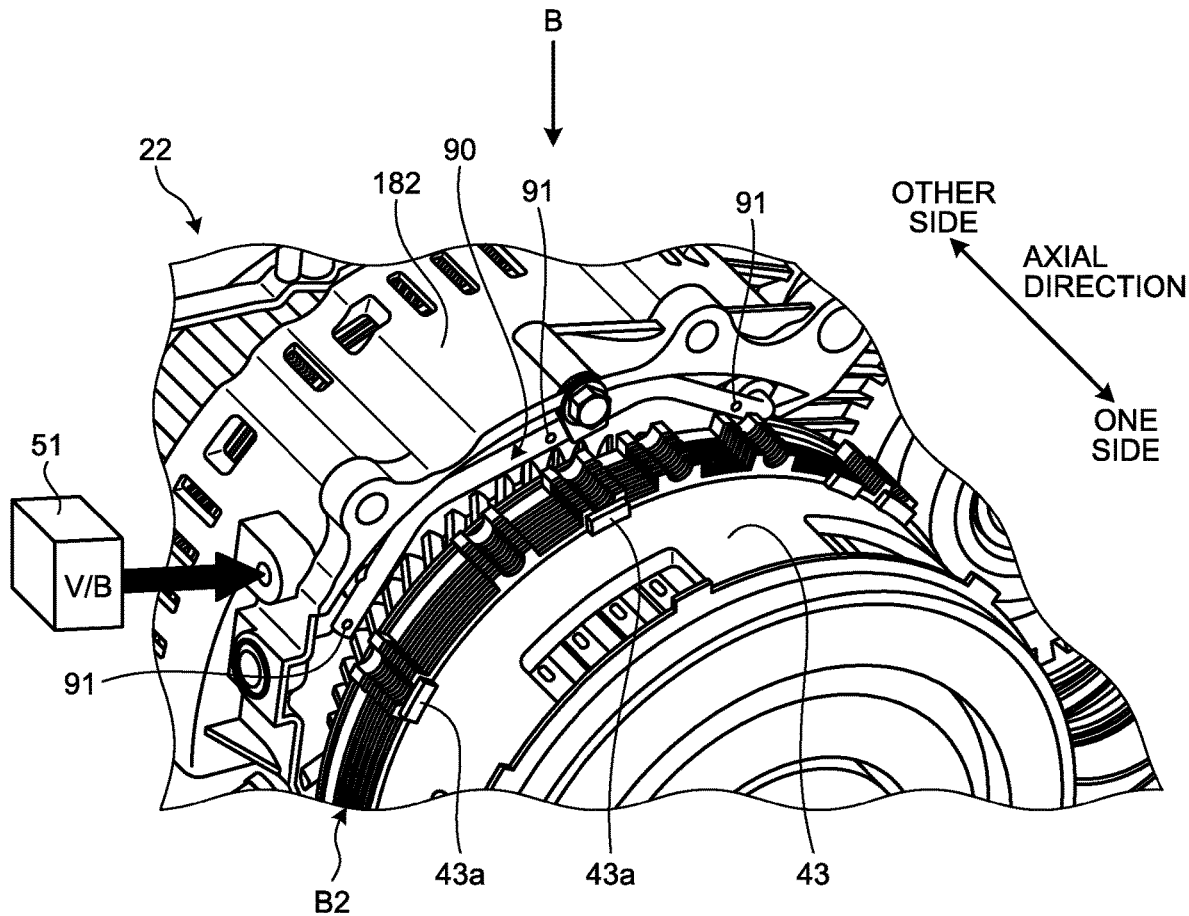
FIG. 7 is a perspective view illustrating a state where the transmission case is removed.
Figure 8:
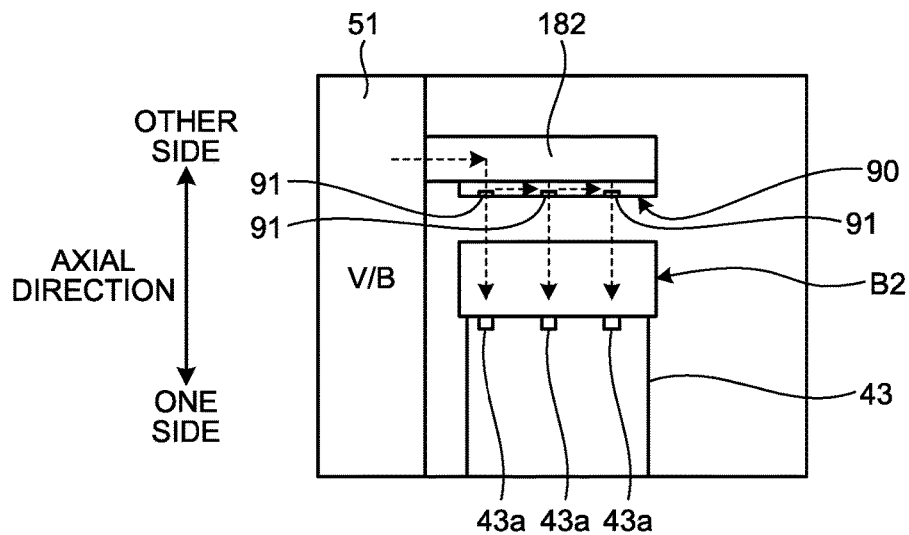
FIG. 8 is a schematic view illustrating a flow of lubricating oil passing through the tube.

Here, with reference to FIGS. 4 to 8, a supply device to supply the lubricating oil to the second brake B2 will be described. FIG. 4 is a view illustrating an internal structure of the transmission case 18. FIG. 5 is a schematic view illustrating a method of supplying lubricating oil from a tube of the supply device to the friction engagement element. FIG. 6 is a schematic view illustrating a case where the second brake B2 is viewed from the axial direction. FIG. 7 is a perspective view illustrating a state where the transmission case 18 is removed. FIG. 8 is a schematic view illustrating a flow of lubricating oil passing through the tube. Meanwhile, the cross-sectional view of FIG. 5 is view illustrating a cross-sectional view taken along line A-A of FIG. 6. The schematic view of FIG. 8 is a view schematically illustrating a view of arrow B of FIG. 7.

As illustrated in FIG. 4, the second brake B2 is configured by a friction type multi-disc brake disposed at a position radially outwardly separated from the axial center RC. This second brake B2 is engaged and released by a hydraulic actuator 42. The hydraulic actuator 42 has a piston 43 that is axially moved by a hydraulic pressure supplied to a hydraulic chamber. The piston 43 is a movable member formed in a cylindrical shape, and receives oil pressure from the hydraulic chamber provided on one side in the axial direction, to stroke toward the other side in the axial direction. The second brake B2 is configured to include a fixed-side friction engagement element attached to an inner peripheral surface 18a of the transmission case 18.

As illustrated in FIGS. 5 and 6, the second brake B2 has a first plate 71, which is a fixed-side friction engagement element, and a second plate 72, which is a rotation-side friction engagement element. The first plate 71 is formed of annular clutch plates, and an outer peripheral portion thereof are spline-fitted to the transmission case 18 to be non-rotatably fixed. On the outer peripheral portion of the first plate 71, a spline teeth 71a are provided. On the inner peripheral surface 18a of the transmission case 18, a spline groove 181 is provided. The spline teeth 71a are fitted in the spline groove 181. The spline groove 181 extends in the axial direction.

The second plate 72 is formed of annular clutch plates (clutch discs), and an inner peripheral portion thereof are spline-fitted to a hub 73 to be rotatable. The hub 73 is a cylindrical rotary member, and rotates integrally with the carrier RCA of the Ravigneaux planetary gear device. A spline teeth provided on the inner peripheral portion of the second plate 72 are fitted in a spline groove provided on an outer peripheral portion of the hub 73. The second plate 72 is provided with a friction material. When the second brake B2 is engaged, the friction material of the second plate 72 is sandwiched by the first plate 71. A plurality of first plates 71 and second plates 72 are individually provided, and are alternately arranged aligned in the axial direction. Note that, in this description, the first plate 71 may be referred to as an "engagement plate", and the second plate 72 may be referred to as a "friction plate".

Further, as illustrated in FIGS. 4 and 5, a tube 90 is provided in the transmission case 18 as a supply device that supplies lubricating oil to the individual plates 71 and 72 of the second brake B2. The tube 90 is attached to a center support 182, which is a fixed member, inside the transmission case 18. The tube 90 is disposed above the axial center RC, and is disposed at the same height as a radial position at which the first plate 71 of the second brake B2 is disposed. Further, the tube 90 is disposed at a position axially separated from the second brake B2. Into this tube 90, lubricating oil supplied from the hydraulic control circuit 50 is pumped.

The tube 90 is formed with one or more injection holes 91 that inject lubricating oil toward the inner peripheral surface 18a of the transmission case 18. The injection holes 91 are through holes penetrating the tube 90, and the injection holes 91 are provided at different places in an extending direction of the tube 90. Lubricating oil injected from the injection holes 91 is made to contact (hit) the inner peripheral surface 18a of the transmission case 18 located above the second brake B2, as illustrated by a broken-line arrow in FIG. 5. The tube 90 and the injection holes 91 are arranged such that lubricating oil is splashed toward a target injection point S in the inner peripheral surface 18a. Further, a radial gap is generated between a surface (inner peripheral surface 18a) of the spline groove 181 and the spline teeth 71a of the first plate 71. The injection holes 91 are open toward this radial gap. The target injection point S is set on the inner peripheral surface 18a located above the spline teeth 71a of the first plate 71.

The lubricating oil injected from the injection holes 91 of the tube 90 is splashed toward the inner peripheral surface 18a located at a position axially separated from and vertically (radially) above the injection holes 91. The lubricating oil having contacted the upper inner peripheral surface 18a flows along the inner peripheral surface 18a axially toward a back side (one side) in the axial direction. Then, the lubricating oil drops on the individual plates 71 and 72 below from the inner peripheral surface 18a above by gravity. Furthermore, the lubricating oil having contacted the inner peripheral surface 18a above and bounced downward is scattered toward the individual plates 71 and 72. This allows the lubricating oil having dropped from the inner peripheral surface 18a to be supplied to an axial gap between the spline teeth 71a of the first plates 71. Then, the lubricating oil is supplied to the individual second plates 72 disposed to be sandwiched between the first plates 71.

Further, as illustrated in FIG. 6, the spline teeth 71a of the first plate 71 is formed in a concave shape in which a part (central portion in the peripheral direction) of an outer peripheral portion is recessed inward in the radial direction. Since the spline teeth 71a having this concave shape is fitted in the spline groove 181, the inside of the spline groove 181 is configured to have a structure in which a wall portion 43a of the piston 43 can be seen over the concave shape of the spline teeth 71a. The wall portion 43a is a portion disposed inside the spline groove 181, and functions as a portion that restricts a flow of the lubricating oil to the back side in the axial direction. The tube 90 is disposed on a side opposite to the piston 43 with respect to the plurality of first plates 71.

As illustrated in FIG. 7, the piston 43 has a plurality of wall portions 43a at peripheral positions corresponding to the spline teeth 71a of the first plate 71. This wall portion 43a is configured such that a part of the cylindrical piston 43 protrudes radially outward.

The tube 90 is attached to the center support 182 by bolt fastening, and extends in a peripherally curved shape along an annular shape of the first plate 71. At peripheral positions corresponding to the spline teeth 71a of the first plate 71, three injection holes 91 are provided.

Further, a supply port (inlet) of the tube 90 is connected to a connection port of the center support 182. As illustrated in FIG. 8, the center support 182 is connected with a valve body (V/B) 51. The valve body 51 is configured to be included in the hydraulic control circuit 50. That is, lubricating oil is supplied from the valve body 51 of the hydraulic control circuit 50 to an oil passage in the center support 182, and this lubricating oil flows from the center support 182 into the tube 90 through the supply port of the tube 90 and is injected from the injection holes 91 toward the inner peripheral surface 18a.

As illustrated by a broken line arrow in FIG. 8, when the tube 90 is viewed from above the transmission case 18, lubricating oil is injected toward one side in the axial direction from three injection holes 91 provided in the tube 90. The injected lubricating oil is regulated by the wall portion 43a of the piston 43 located forward so as not to be splashed further to the back side (one side) in the axial direction.

The supply device including the tube 90 configured as described above is controlled by the electronic control unit 60. That is, the electronic control unit 60 can switch between a supply state for injecting lubricating oil from the tube 90 and a stop state for not injecting the lubricating oil from the tube 90, by controlling the hydraulic control circuit 50. For example, the mechanical oil pump 34 is connected to the tube 90 via a switching valve. There is provided a solenoid valve that controls an operation of this switching valve. By the electronic control unit 60 controlling this solenoid valve, switching is performed between the supply state where the switching valve is opened and the mechanical oil pump 34 and the tube 90 are in communication with each other, and the stop state where the switching valve is closed and the mechanical oil pump 34 and the tube 90 are disconnected.

Figure 9:
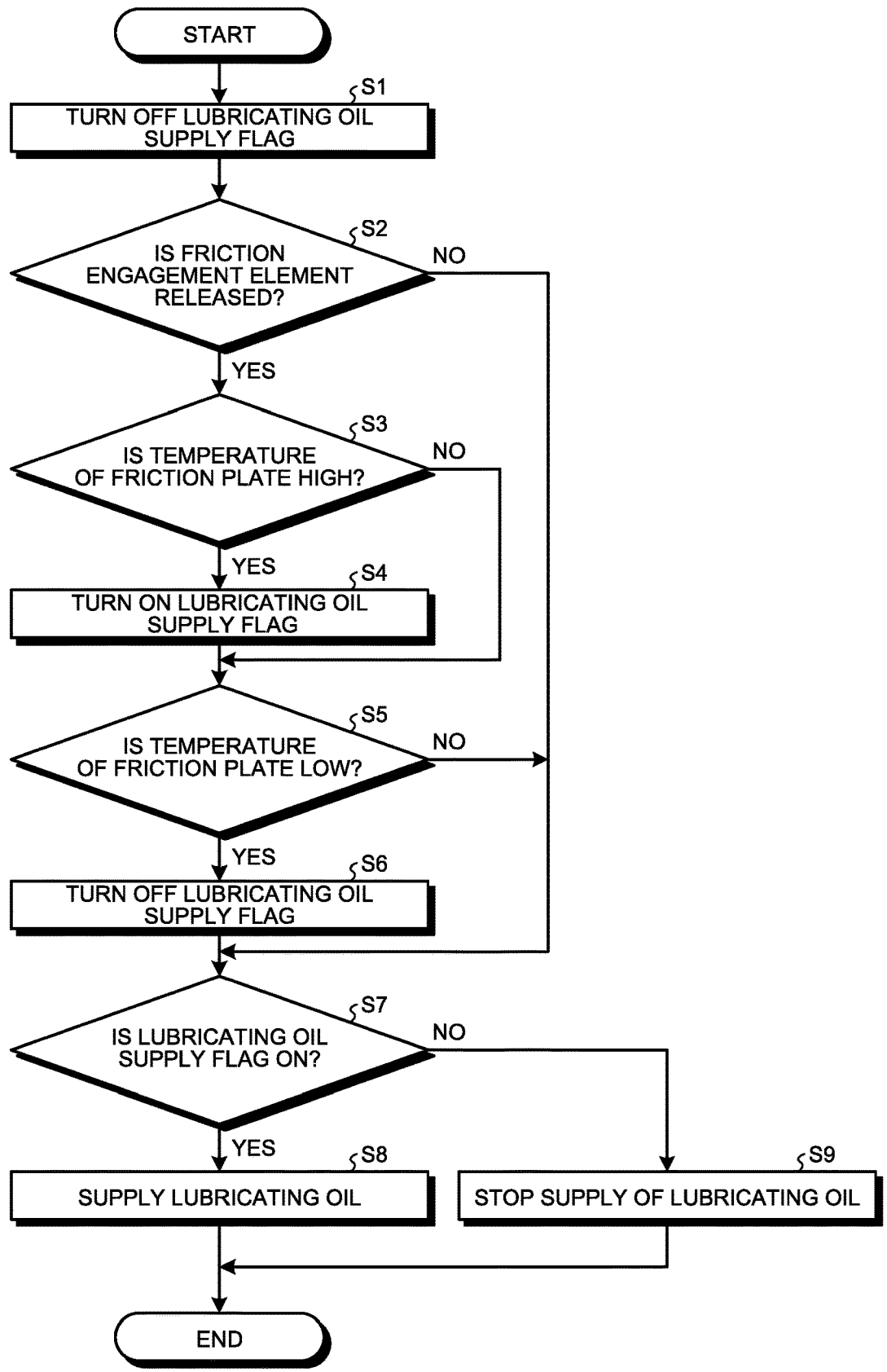
FIG. 9 is a flowchart illustrating a supply control flow.

FIG. 9 is a flowchart illustrating a supply control flow. The control illustrated in FIG. 9 is executed by the electronic control unit 60 every control cycle.

First, the electronic control unit 60 turns off a supply flag of lubricating oil (step S1). In step S1, a supply flag stored in a storage unit of the electronic control unit 60 is turned off.

The electronic control unit 60 determines whether the second brake B2 is released (step S2). In step S2, it is determined whether the first plate 71 and the second plate 72, which are friction engagement elements, are in a separated state (released state). As this determination method, the electronic control unit 60 determines whether a shift stage of the automatic transmission 22 is set to any of the second gear stage to the eighth gear stage. As illustrated in FIG. 3 described above, the second brake B2 is in the released state at these shift stages.

When the second brake B2 is not released (step S2: No), this control routine proceeds to step S7. Cases where negative determination is made in step S2 include, in addition to a case where the second brake B2 is engaged, a case of during a shift operation such as an engagement transition period or a release transition period.

When the second brake B2 is released (step S2: Yes), the electronic control unit 60 determines whether a temperature of the friction plate is high (step S3). In step S3, it is determined whether a temperature of the second plate 72, which is a friction plate, is higher than a predetermined value. This predetermined value is a preset threshold. Since the first plate 71 and the second plate 72 slip during the release transition period immediately after switching of the second brake B2 from an engaged state to the released state, the temperature of the second plate 72 rises due to the frictional heat. Therefore, even if the second brake B2 is in the released state, the plate temperature becomes high immediately after switching from the engaged state to the released state.

Further, in step S3, it may be determined whether a plate temperature is high for the first plate 71 of the engagement plate, rather than the second plate 72 of the friction plate. In short, in step S3, it is determined whether a temperature (plate temperature) of the friction engagement element of the second brake B2 is higher than a predetermined value.

Furthermore, the plate temperature used in the determination of step S3 may be either an actual measurement value or a prediction value. For example, in using a plate temperature of an actual measurement value, the automatic transmission 22 is provided with a temperature sensor that detects a temperature of the first plate 71 or a temperature of the second plate 72. On the basis of the temperature detected by this temperature sensor, the electronic control unit 60 determines whether a plate temperature is high. In addition, in using a plate temperature of a predicted value, the electronic control unit 60 performs the high temperature determination by using an estimation formula that can estimate the plate temperature. This estimation formula is an estimation formula obtained in advance by, for example, experiment. In this case, a parameter indicating a traveling state of the vehicle 10 is applied to the estimation formula, to estimate the plate temperature. As this parameter, it is possible to use a heating value of the first plate 71, a heating value of the second plate 72, a torque, a differential rotational speed between the first plate 71 and the second plate 72 (rotational speed of the second plate 72), an engagement time of the second brake B2, the number of shifts per predetermined time, a temperature of lubricating oil, an accelerator opening degree, a vehicle speed and the like. Furthermore, the plate temperature can also be estimated by a traveling condition of the vehicle 10 or the like without using the estimation formula.

When the temperature of the friction plate is low (step S3: No), this control routine proceeds to step S5.

When the temperature of the friction plate is high (step S3: Yes), the electronic control unit 60 turns on the supply flag of lubricating oil (step S4). In step S4, the supply flag of lubricating oil is switched from off to on.

Then, the electronic control unit 60 determines whether a temperature of the friction plate is low (step S5). In step S5, as in step S3 described above, determination may be made with use of either a plate temperature of an actual measurement value or a prediction value.

When the temperature of the friction plate is high (step S5: No), this control routine proceeds to step S7.

When the temperature of the friction plate is low (step S5: Yes), the electronic control unit 60 turns off the supply flag of lubricating oil (step S6). In step S6, the supply flag is switched off when the supply flag is on, and kept off when the supply flag is off.

Then, the electronic control unit 60 determines whether the supply flag of lubricating oil is on (step S7). In step S7, it is determined whether the supply flag stored (set) in the storage unit of the electronic control unit 60 is on.

When the supply flag of lubricating oil is on (step S7: Yes), the electronic control unit 60 supplies lubricating oil from the tube 90 to the friction engagement element of the second brake B2 (step S8). In step S8, the above-described supply control is executed to inject the lubricating oil from the injection holes 91 of the tube 90 toward the inner peripheral surface 18a. Further, the case where positive determination is made in step S7 is a case where a temperature of the second plate 72 including the friction material becomes high while the second brake B2 is in the released state. When step S8 is performed, this control routine ends.

When the supply flag of lubricating oil is off (step S7: No), the electronic control unit 60 stops supply of the lubricating oil (step S9). Cases where negative determination is made in step S7 include a case where a temperature of the second plate 72 including the friction material is low even when the second brake B2 is in the released state. In this case, step S9 is performed to stop the supply of the lubricating oil from the tube 90. When step S9 is performed, this control routine ends.

As described above, according to the embodiment, since lubricating oil is injected from the injection holes 91 of the tube 90 toward the inner peripheral surface 18a of the transmission case 18, the lubricating oil can be distributed entirely over the plurality of first plates 71 and second plates 72 forming the second brake B2. This enables suppression of an increase of the plate temperature (temperature of the individual plates 71 and 72) of the second brake B2 by a cooling effect of the lubricating oil.

Further, only when the temperature of the individual plates 71 and 72 is high while the second brake B2 is released, lubricating oil may be injected from the injection holes 91 of the tube 90 toward the surface of the spline groove 181. This allows the lubricating oil to be supplied to a portion required for cooling (the friction engagement element) exclusively when it is required, in a limited space in the transmission case 18.

In addition, when the temperature of the individual plates 71 and 72 decreases while the second brake B2 is released, the supply of the lubricating oil from the tube 90 may be stopped. This can reduce drag loss of the second brake B2.

Furthermore, the hub 73 is not provided with a through hole penetrating in the radial direction at a portion where the second plates 72 are fitted in line in the axial direction. Therefore, a supply path of the lubricating oil from the axial center RC side can be disconnected by the cylindrical portion of the hub 73. Thus, as illustrated by the arrows in FIG. 4, even if the lubricating oil on the axial center RC side is scattered radially outward due to rotation of the second planetary gear device 38 disposed on the inner diameter side of the hub 73, it is possible to suppress a flow of this lubricating oil from the axial center RC side to the plurality of friction engagement elements disposed on the outer peripheral side of the hub 73.

Moreover, the injection of the lubricating oil described above can be expressed as ejection of the lubricating oil. Whereas, this injection is distinguished from spray. When the lubricating oil is sprayed entirely from a side of the second plate B2, the lubricating oil is to be applied on a portion where cooling is unnecessary, and not to be distributed entirely over the individual plates 71 and 72. Moreover, even in the injection, in a case of injecting lubricating oil from a side of the second brake B2 in a lateral direction, the lubricating oil is not to be distributed entirely over the individual plates 71 and 72. This is because, since the lubricating oil does not pass through the inner peripheral surface 18a of the transmission case 18, it is difficult to supply the lubricating oil entirely over the individual plates 71 and 72. On the other hand, in the embodiment, the lubricating oil is injected from the tube 90 in such a manner that the lubricating oil is splashed from the injection holes 91 toward the target point on the inner peripheral surface 18a.

Meanwhile, the number of the injection holes 91 provided in the tube 90 is not limited to three. The injection holes 91 may simply be provided at peripheral positions corresponding to the spline teeth 71a. Further, the tube 90 may be made of metal or resin.

Further, the multi-disc brake to be supplied with the lubricating oil is simply required to have a friction engagement element that is spline-fitted to the transmission case 18, and is not limited to the second brake B2 of the automatic transmission 22 described above. That is, the disclosure is not limited to the automatic transmission 22 in which the forward gear stage can be set up to the eighth gear stage.

In the present disclosure, lubricating oil can be injected from the injection holes of the tube toward the surface of the spline groove located above a spline teeth of a first friction engagement element inside the transmission case. This allows the lubricating oil to be supplied to each friction engagement element of the multi-disc brake via the spline groove of the transmission case, enabling the lubricating oil to be distributed to a plurality of friction engagement elements.

According to an embodiment, it is possible to suppress a flow, radially outward with respect to a cylindrical portion of the hub, of lubricating oil that is scattered radially outward from an axial center side of the automatic transmission due to rotation of a rotary member. This enables disconnection of a supply path from the axial center side, and can reduce drag loss due to this lubricating oil.

According to an embodiment, the lubricating oil injected from the injection holes toward the surface of the spline groove flows along the surface of the spline groove in the axial direction, and flows by gravity to each friction engagement element located below. This enables supply of the lubricating oil to the plurality of friction engagement elements arranged aligned in the axial direction, and allows the lubricating oil to be distributed in the peripheral direction of the friction engagement element since the lubricating oil flows by gravity from the top to the bottom in each friction engagement element.

According to an embodiment, when the lubricating oil injected from the injection holes into the spline groove flows in the axial direction, the flow of the lubricating oil can be restricted by the wall portion of the piston. This enables suppression of the flow of the lubricating oil to a position where each friction engagement element is not provided in the axial direction, and enables supply of the lubricating oil to a plurality of friction engagement elements located in front of the piston.

According to an embodiment, since the lubricating oil is supplied from the tube exclusively when the multi-disc brake is in a released state and a high temperature state, the lubricating oil can efficiently and entirely cool the individual friction engagement elements.

Although the disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic transmission comprising:
   a transmission case;
   a hub which is a rotary member;
   a multi-disc brake including a first friction engagement element having first plates and a second friction engagement element having second plates, the first plates and the second plates being alternately arranged in an axial direction, the first friction engagement element being spline-fitted to an inner peripheral surface of the transmission case, the second friction engagement element being spline-fitted to the hub; and
   a tube, which is provided in the transmission case, that supplies lubricating oil to the first friction engagement element and the second friction engagement element, wherein
   the tube has injection holes that inject the lubricating oil toward a spline groove, which is fitted with spline teeth of the first friction engagement element on the inner peripheral surface of the transmission case, and
   the injection holes open toward a gap, which is formed between the spline groove and the spline teeth, and inject the lubricating oil to cause the lubricating oil to contact a surface of the spline groove located above the spline teeth.

2. The automatic transmission according to claim 1, wherein
   the hub is not provided with any through holes, which penetrate in a radial direction, in a cylindrical portion where a plurality of the second friction engagement elements are spline-fitted.

3. The automatic transmission according to claim 1, wherein
   the tube is arranged above a position of a rotation center of the hub at a position separated from the multi-disc brake in the axial direction, and
   the lubricating oil injected from the injection holes contacts a surface of the spline groove located above the spline teeth, and then flows via the spline groove to the first friction engagement element and the second friction engagement element, which are located below.

4. The automatic transmission according to claim 1, wherein
   the spline teeth are formed in a concave shape in which a part of an outer peripheral portion is recessed radially inward,
   the multi-disc brake further includes: a piston that presses, in the axial direction, the first friction engagement element to cause the first friction engagement element and the second friction engagement element to be frictionally engaged with each other,
   the piston has a wall portion, which protrudes radially outward beyond a concave shape of the spline teeth, as a portion that moves in the axial direction inside the spline groove, and
   the tube is arranged opposite to the piston in the axial direction with respect to the first friction engagement element.

5. The automatic transmission according to claim 1, further comprising:
   a control device that supplies the lubricating oil from the injection holes of the tube to the first friction engagement element and the second friction engagement element when the multi-disc brake is in a released state and a high-temperature state, and stops supply of the lubricating oil from the injection hole of the tube when the multi-disc brake is in an engaged state.

* * * * *